United States Patent [19]

Anezaki et al.

[11] Patent Number: 5,071,673
[45] Date of Patent: Dec. 10, 1991

[54] METHOD FOR PRODUCING OPTICAL DISC

[75] Inventors: Yoshikazu Anezaki; Koji Sasaki, both of Miyagi; Hidetoshi Watanabe, Ibaragi, all of Japan

[73] Assignee: Sony Corporation, Tokyo, Japan

[21] Appl. No.: 644,890

[22] Filed: Jan. 23, 1991

[30] Foreign Application Priority Data

Jan. 30, 1990 [JP] Japan .................................. 2-20144

[51] Int. Cl.$^5$ ............................................. B05D 3/06
[52] U.S. Cl. .................................. 427/54.1; 346/137; 427/389.7
[58] Field of Search ............. 346/137; 427/54.1, 389.7

[56] References Cited

U.S. PATENT DOCUMENTS 4,535,030  8/1985  Rounds ........................... 346/137 X
4,668,550  5/1987  Tajima et al. ................... 346/137 X
4,731,620  3/1988  Yabe et al. ....................... 346/137

Primary Examiner—Michael Lusignan
Attorney, Agent, or Firm—Philip M. Shaw, Jr.

[57] ABSTRACT

A method for producing an optical disc including the step of transferring a pattern of alternate projections and recesses from a stamper to a glass base plate by photopolymerization of a resin curable with ultraviolet rays, wherein the glass base plate is previously processed by surface processing by a suitable coupling agent. Before or after the surface processing with the coupling agent, the glass base plate is heated under a reduced pressure for improving bonding properties between the glass base plate and the resin curable with ultraviolet rays.

18 Claims, 3 Drawing Sheets

METHOD FOR PRODUCING OPTICAL DISC

BACKGROUND OF THE INVENTION

1. Field of the Invention

This invention relates to a method for producing an optical disc, such as a digital audio disc, that is a compact disc, or a magneto-optical disc. More particularly, it relates to an improved method for producing an optical disc by a photopolymerization method, according to which a pattern of projections and recesses is transferred to a glass base plate by photopolymerization of a synthetic resin curable with ultraviolet rays.

2. Related Art Statement

For producing an optical disc, such as a digital audio disc, that is a so-called compact disc, or a magneto-optical disc, there is proposed, as a technique for transferring the pattern of alternate projections and recesses, inverted from pits and grooves, onto the base plate, a photopolymerization method, according to which a stamper having such pattern thereon is brought into tight contact with a liquid resin curable with ultraviolet rays and irradiated by ultraviolet rays for photopolymerizing the resin.

More specifically, the photopolymerization method comprises the steps of coating a liquid resin curable with ultraviolet rays on the surface of a light transmitting base plate for a disc by, for example, screen printing, bringing a stamper having a pattern of fine projections and recesses on its surface into intimate contact with the resin by a roller irradiating the base plate side of the resulting base plate-stamper assembly with ultraviolet rays for photopolymerizing and thereby curing the resin, and peeling the base plate and the cured resin layer from the stamper for transferring the fine pattern of alternate projections and recesses, which are the inversions of the pits and grooves, from the stamper surface onto the base plate surface.

Since the resin curable with ultraviolet rays is brought in the liquid state into tight contact with the stamper, duplication of the pattern may be achieved with higher accuracy, while the risk of stamper deterioration may be eliminated almost completely. Above all, the base plate with excellent dimensional stability and thermal resistance and favorable birefringence may be obtained with the use of the glass base plate.

Meanwhile, for transferring the pattern of alternate projections and recesses on the glass base plate by the photopolymerization method, a problem is raised in connection with the bonding properties between the glass base plate and the resin curable with ultraviolet rays.

With unsatisfactory bonding properties between the glass base plate and the resin curable with ultraviolet rays, there is the risk that, when the base plate is peeled off from the stamper, the resin layer to which the pattern has been transferred from the stamper, remains affixed to the stamper, or defects or drosses are produced in the cured resin on the glass base plate.

In view of the foregoing, attempts have been made for processing the surface of the glass base plate by a coupling agent in advance for procuring adhesive or bonding properties between the glass base plate and the resin, as disclosed in Japanese Patent Publication No. JP-A-62-71038.

The coupling agent includes both the functional group capable of bonding with an inorganic material, such as glass, and the functional group capable of bonding with the resin curable with ultraviolet rays, and thus possibly acts for briding the glass and resin for firmly bonding the glass base plate and the resin curable with ultraviolet rays to each other.

However, it has been found by our further researches that, despite surface processing by the coupling agent, peeling of the resin layer occurs frequently due to an insufficient bonding power, such that there is still ample room for improvement if the optical disc with extremely high reliability is to be produced.

OBJECT AND SUMMARY OF THE INVENTION

It is a principal object of the present invention to provide method for producing an optical disc whereby a sufficient bonding power between the glass base plate and the resin may be procured to render it possible to produce an optical disc having extremely high reliability.

As a result of our eager searches and investigations, the present inventors have arrived at a conclusion that the moisture remaining on the glass base plate affect the bonding power between the resin and the glass base plate achieved by the coupling agent.

The present invention has been fulfilled on the basis of this finding and resides in a method for producing an optical disc comprising the steps of processing a glass base plate by surface processing by a coupling agent, forming a resin layer of a resin curable with ultraviolet rays on said glass base plate processed by the coupling agent, bringing said resin layer into tight contact with a stamper on which a pattern of alternate projections and recesses are formed, to form a resin layer-stamper assembly, irradiating said resin layer-stamper assembly with ultraviolet rays for photopolymerization, and peeling said resin layer, on which the pattern of alternate projections and recesses has been transferred from the stamper, and said glass base plate, from said stamper, wherein the improvement resides in that, prior to and-/or after said step of surface processing, said glass base plate is heated under a reduced pressure at a heating temperature of not lower than 100° C.

The glass base plate, used as a base plate for an optical disc, is previously rinsed by freon for purifying its surface. As a result thereof, a minor amount of the moisture tends to remain on the plate surface. Incidentally, the moisture contained in the atmospheric air may be adsorbed on the plate surface during storage of the glass base plate.

With the moisture thus remaining on the glass base plate, a sufficient bonding power between the glass base plate and the resin layer cannot be developed despite surface processing by the coupling agent.

According to the present invention, the glass base plate is heated under a reduced pressure to a heating temperature not lower than 100° C., before and/or after surface processing by the coupling agent, whereby the moisture otherwise remaining on the glass base plate may be removed satisfactorily.

Thus, the effect of surface processing by the coupling agent may be displayed more fully, and a sufficient bonding power may be assured between the glass base plate and the resin layer.

BRIEF DESCRIPTION OF THE DRAWINGS

FIGS. 2A to 2F are diagrammatic perspective views for illustrating the photopolymerization process, wherein FIG. 2A shows the screen printing step;

FIG. 2B shows, in perspective, a glass base plate on which UV ray curable resin has been printed;

FIG. 2C shows the step of superimposing the glass base plate on the stamper;

FIG. 2D shows the step of pressing the glass base plate and the stamper together by a roll;

FIG. 2E shows the step of irradiation of ultraviolet rays; and

FIG. 2F shows the step of peeling the base plate from the stamper.

DESCRIPTION OF PREFERRED EMBODIMENT

Figure 1:
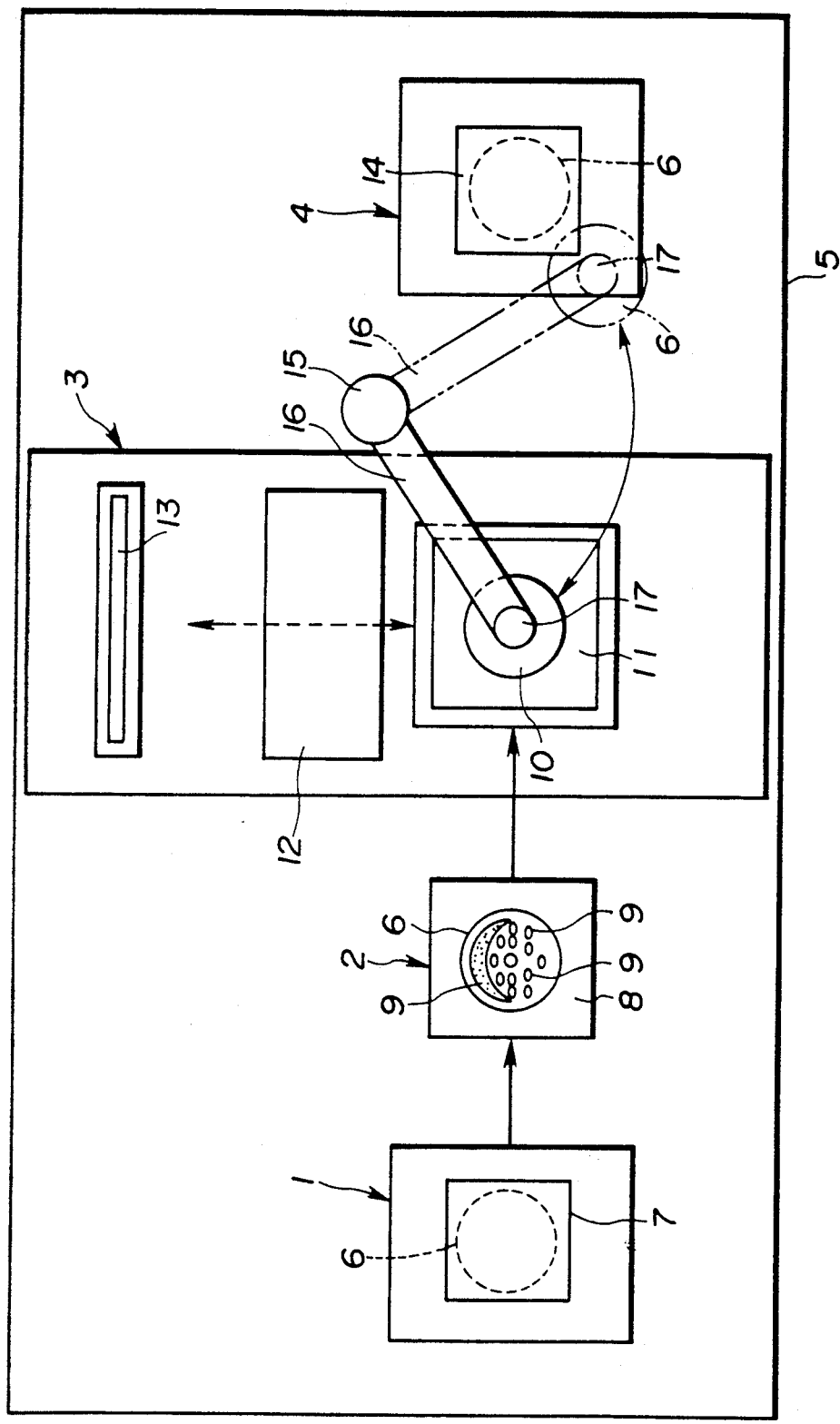
FIG. 1 is a diagrammatic plan view showing a device for producing a disc by transferring patterns of alternating projections and recess on a stamper according to the present invention.

The method for producing an optical disc according to the present invention will be hereinafter explained.

The first step of the method for producing the optical disc according to the present invention is the step of heating or baking the glass base plate.

During the pre-use rising step or during storage of the glass base plate, the mositure tends to become affixed to and remain on the plate surface. Hence, in the present embodiment, the base plate is heated for removing the moisture before the surface treatment by a coupling agent.

That is, the glass base plate to be in use is deposited in an oven and heated in vacuo to remove the moisture sufficiently.

The heating temperature is 100° C. or higher, and during heating, the reduced pressure in the order of several Torrs is maintained.

Although any heating temperature not higher than the melting temperature of the glass base plate may be employed, the heating temperature ranging between 100° and 150° C. is most preferred because the base plate or the vessel may be injured or the cooling time may be prolonged excessively with too high a heating temperature.

The heating time duration may be selected, as a function of the heating temperature, so as to be long enough to remove the moisture from the glass base plate sufficiently. For example, with the heating temperature of 100° to 150° C., the heating time in the order of 20 minutes to 2 hours suffices. If the heating time is shorter than this range, the moisture cannot be removed sufficiently resulting in shortage in the bonding strength. Although an excessively long heating time is not hindersome in improving the bonding strength, the optimum heating time needs to be selected so that the production efficiency of the process is not thereby lowered.

After completion of heating, the glass base plate is desirably cooled as it is still contained in an oven which is maintained in the state of reduced pressure. If the state of reduced pressure is released while the temperature of the glass base plate is still high, there is the risk that the moisture in air be again deposited on the glass base plate during cooling.

The glass base plate, from which the moisture has been removed sufficiently by the heating step, then undergoes a surface treatment or processing step by a coupling agent.

The surface treatment by the coupling agent is performed by diluting the coupling agent by a solvent, dipping the glass base plate for processing therein, and then uplifting the thus processed glass base plate.

There is no limitation to the types of the coupling agent employed. Thus, it suffices if the coupling agent has both the functional group or groups capable of bonding with resins, such as amino-, epoxy-, vinyl-, acryloxy- or methacryloxy groups, and the functional group or groups capable of bonding with inorganic materials, such as alkoxy or acryloxy groups.

Specific examples of the coupling agents include silane coupling agents, such as γ-(2-aminoethyl) aminopropyl trimethoxysilane, γ-(2-aminoethyl)aminopropylmethyl dimethoxysilane, γ-methacryloxypropyl trimethoxysilane, vinyl trimethoxysilane, vinyl triethoxysilane or γ-glycidoxypropyl trimethoxysilane, and titanium coupling agents, such as isopropyldi(stearoyl) methacryl titanate, isopropyldi(methacryl) stearoyl titanate, isopropyldi(stearoyl) acryl titanate or isopropyldi(acryl) stearoyl titanate.

As the solvents for diluting the above mentioned coupling agents, aqueous solvents, such as demineralized water, are commonly employed. However, if the aqueous solvents are used, the state of drying of the base plate is not satisfactory, such that stains may be left on the plate surface. The glass base plate with such stains left thereon may be treated as rejects because the light may be inconveniently scattered at these stains. On the other hand, the aqueous solvents tend to detract from the effects of the coupling agent in improving the bonding properties.

Therefore, as the diluent solvents, organic solvents, above all, ester base solvents are most preferred. These ester base solvents are only difficultly soluble in water, while scarcely affecting the coupling agents. In addition, with the use of the ester base solvents, the drying time may be shortened, while stains are not produced on drying.

Any of the commonly used ester base solvents may be employed, such as ethyl acetate, propyl acetate or butyl acetate. Of these, butyl acetate is most preferred.

The concentration of the coupling agent is preferably 0.1 to 5 wt. %. Uniform surface processing can hardly be achieved with too high a concentration or too low a concentration of the coupling agent.

Among the critical factors in surface treatment or processing by the coupling agent is the base plate uplifting speed. If the uplifting speed is too high, uniform processing can hardly be achieved because the flow of the processing liquid tends to be induced. For realizing a uniform processing state, the glass base plate uplifting speed is to be not much higher than 5 mm per second. The lower the uplifting speed, the better the drying state of the glass base plate. There is, however, the lower limit of the uplifting speed because the productive efficiency is drastically lowered with too low an uplifting speed.

After the surface processing by the coupling agent is completed, the step of transferring the alternate projections and recesses on the stamper onto the surface of the base plate is performed by the photopolymerization process including injecting a resin curable with ultraviolet rays between the base plate and the stamper and curing the resin. Before proceeding to the photopolymerization process, the glass base plate processed with the coupling agent may be further heated under a reduced pressure to remove the moisture still adsorbed to the glass base plate after surface processing by the coupling agent.

The heating conditions at this time are the same as those of heating performed prior to surface processing by the coupling agent. The heating time of 3 to 15 hours is preferred.

The above mentioned photopolymerization process is performed on the glass base plate, previously processed by surface treatment or processing with the aid of the coupling agent, thereby producing an optical disc on which the pattern of alternate projections and recess have been transferred from the stamper.

FIG. 1 shows the general construction of a device for producing an optical disc by the photopolymer method.

The device shown in FIG. 1 is adapted for continuously performing a series of steps of the photopolymerization process and is constituted by a base plate supply section 1 for accommodating glass base plates previously treated by surface processing by the above mentioned coupling agent, a screen printing section 2 for coating a synthetic resin curable with UV rays on the glass base plate, a transfer section 3 for pressing a stamper against the resin by a roll and irradiating the resulting stamper-resin assembly with UV rays for photopolymerization, and a base plate takeout section 4 for accommodating the glass base plates on which the pattern on the stamper has been transferred. These components 1 to 4 are arranged in this order on a machine base 5.

The base plate supply section 1 is adapted for transiently storing a number of glass base plates 6 for sequentially supplying the base plates 6 to the adjacent screen printing section 2, and is provided with a multitier cartridge 7 for storing a number of glass base plates 6.

The screen printing section 2 includes a printing base 8 having a base plate rest for firmly holding the glass base plate 6 thereon by vacuum chucking, a screen for screen printing, squeeze or the like, and is adapted for applying a liquid resin curable by UV rays 9 by screen printing on one surface of the glass base plates 6 taken out mechanically and supplied thereto one by one from the cartridge 7 by a first base plate transfer unit, not shown.

The transfer section 3 includes the stamper 10 on the surface of which is formed a pattern of projections and recesses, which are inversions of the pits and grooves on the completed disc, and a stamper holder 11 holding the stamper 10 and movable in the fore and aft direction. The transfer section 3 also includes, along the direction of movement of the stamper holder 11, a roll 12 for pressing the stamper 10 against the glass base plate 6 on which the resin curable with UV rays 9 has been applied, and a light source 13 for irradiation of UV rays for curing the resin 9.

Although not shown, a second base plate transfer unit is provided between the screen printing section 2 and the transfer section 3 for inverting the glass base plate 6 on the printing base 8 upside down and transferring the glass base plate 6 in this state to the transfer section 3 so that the surface of the base plate 6 coated with the resin curable with UV rays 9 faces the stamper 10.

Similarly to the base plate supply section 1, the base plate takeout section 4 is provided with a multitier base plate takeout cartridge 14, whereby the glass base plate 6 on which the pattern of projections and recesses have been transferred from the stamper 10 in the transfer section 3 and which then has been peeled from the stamper 10 is introduced into the takeout section 4 by a third base plate transfer unit. This third base plate transfer unit includes a rotary arm 16 rotated about a rotary shaft 15 and a suction head 17 provided at the distal end of the rotary arm 16, and functions to suck the glass base plate 6 by suction head 17 and to transfer the base plate 6, sucked by the suction head 17, from the transfer section 3 to the takeout cartridge 14 of the base plate takeout section 4.

The base plate for the optical disk is produced by the following steps which are carried out sequentially by the above described device for producing the optical disc.

The glass base plates 6, previously heated and processed by the coupling agent as described hereinabove, are stored transiently in the cartridge 7 in the base plate supply section 1.

The base plates are transferred one by one by the first base plate transfer unit, not shown, onto the printing base 8 of the screen printing section 2.

Figure 2A:
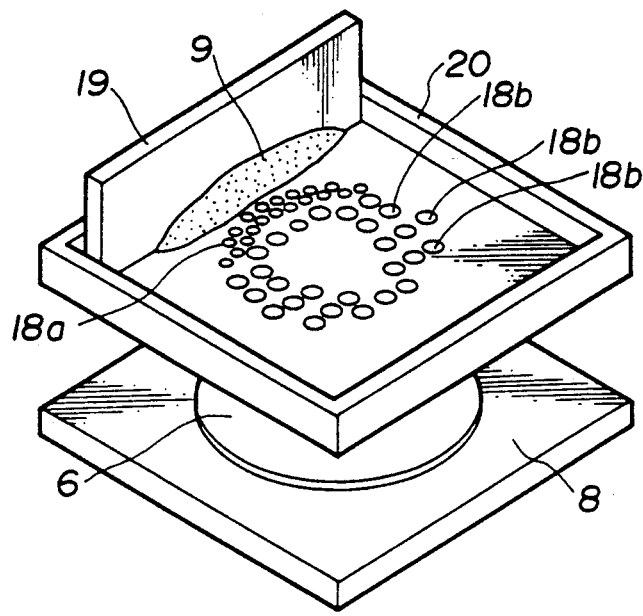

The resin curable with UV rays 9 is applied at once on the glass base plate 6 resting on the printing base 8 by a screen printing device shown in FIG. 2A.

This screen printing device includes a printing screen 18 formed by a thin stainless steel plate formed with predetermined patterns of perforations, and a squeeze 19. The resin curable with UV rays 9 is supplied on the entire printing screen 18 which is applied under tension on a frame 20, and is squeezed by squeeze 19 for printing the resin 9 on the surface of the glass base plate 6 in accordance with the patterns of perforations.

In the present embodiment, the patterns of perforations on the printing screen 18 are constituted by hexagonal patterns, grouped in a crescent shape, and circular patterns 18b offset towards the hexagonal patterns for preventing foaming or leakage of the resin curable with UV rays during the pressing of the base plate onto the stamper 10.

Figure 2B:
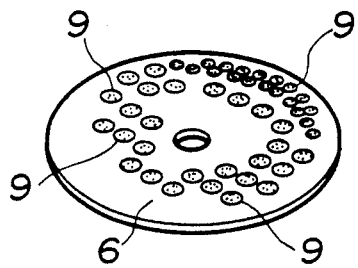

FIG. 2B shows the glass base plate 6 on which the resin curable with UV rays 9 has been applied by screen printing as described hereinabove.

The glass base plate 6 is then transferred to the transfer section 3 where the pattern of alternate projections and recesses on the stamper 10 are transferred onto the glass base plate 6.

Figure 2C:
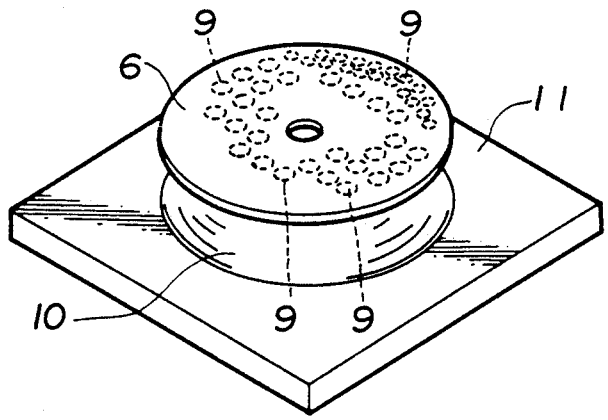

During transfer to the transfer section 3, the glass base plate 6 is turned upside down, so that, as shown in FIG. 2C, the side thereof coated with resin 9 faces downwards, before the base plate 6 is stacked on the stamper 10 resting on the stamper holder 11.

Figure 2D:
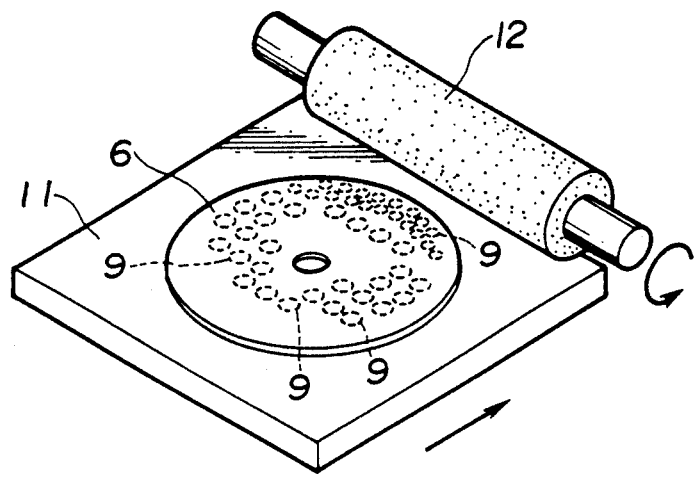

The glass base plate 6, thus stacked on the stamper 10, is pressed by roll 12 by shifting the stamper holder 11, as shown in FIG. 2D, and thereby contacted intimately with the stamper 10. Since the resin curable with UV rays 9 is yet in the liquid state, it may be intruded uniformly into the voids defined by the minute projections and recesses of the stamper 10.

The stamper holder 11 is moved further until the glass base plate 6 kept in intimate contact with the stamper 10 is transferred to a position below the light source 13.

Figure 2E:
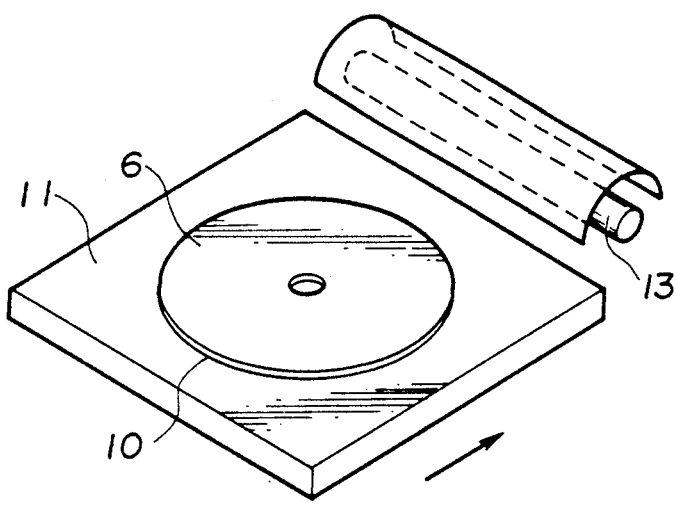

The glass base plate side of the glass base plate-stamper assembly is then irradiated with UV rays, as shown in FIG. 2E, whereby the resin curable with UV rays 9, charged in the voids between the glass base plate 6 and the stamper 10, is cured by photopolymerization. In this manner, the pattern of alternate projections and recesses on the surface of the stamper 10 has been completely transferred onto the layer of the resin curable with UV rays on the glass base plate 6.

Figure 2F:
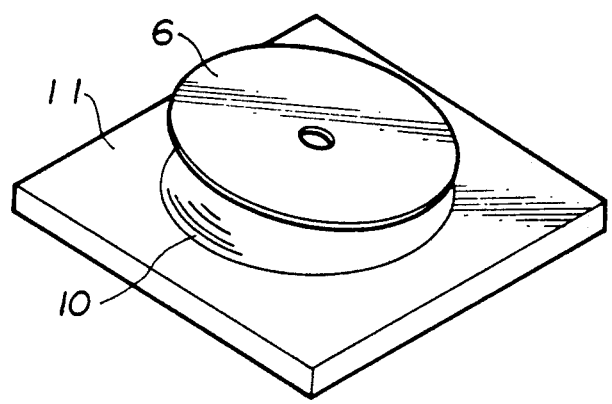

After the end of the transfer of the pattern, the glass base plate 6 is peeled off from the stamper 10, as shown in FIG. 2F, and is transferred by the third base plate transfer unit to the base plate takeout section 5. Since the glass base plate 6 is previously processed by surface processing by the coupling agent and heated under reduced pressure before or after the surface processing, so that it is ready to be bonded to the resin curable with UV rays 9, there is not risk of peeling of the base plate from the layer of the UV curable resin on which the pattern of alternate projections and recesses has been transferred from the stamper.

The base plate for a disc from the above described device for producing the optical disc, is processed into an optical disc after formation thereon of a reflective film, a recording film and a protective layer. The specific structure of the optical disc is optional and hence the reflective and recording films or the protective layer may be selected in any desired manner according to the usages and applications of the optical disc.

For example, in a digital audio disc or a CD-ROM, a metal reflective film, such as an Al film, is formed on the disc base plate on which the patterns of alternate projections and recesses have been transferred. In a magneto-optical disc, a perpendicular magnetization film of, for example, TbFeCo, exhibiting magneto-optical properties, such as Kerr effects or Faraday effects, is formed on the disc substrate. The present invention may also be applied to an optical disc provided with a thin film of low melting metal, a phase change film or a film containing an organic dye as a recording layer.

The base plate for an optical disc, prepared by the above described process steps, exhibits a high bonding strength between the glass base plate and the UV curable resin without the risk of peeling of the UV curable resin layer from the glass base plate.

The present invention is not limited to the above described embodiment. For example, the heating step following surface treatment with the coupling agent may be eliminated within the scope of the present invention.

What is claimed is:

1. A method for producing an optical disc comprising the steps of
   processing a glass base plate by surface processing by a coupling agent,
   forming a resin layer of a resin curable with ultraviolet rays on said glass base plate processed by the coupling agent,
   bringing said resin layer on said base layer into tight contact with a stamper on which a pattern of alternate projections and recesses are formed, to form a base plate-stamper assembly,
   irradiating said base plate-stamper assembly with ultraviolet rays for photopolymerizing said resin, and
   peeling said resin layer, on which the pattern of alternate projections and recesses has been transferred from the stamper, along with said glass base plate, from said stamper,
   wherein the improvement resides in that,
   prior to said step of surface processing, said glass base plate is heated under reduced pressure at a heating temperature not lower than 100° C.

2. The method according to claim 1 wherein the heating temperature is not higher than the melting temperature of said glass base plate.

3. The method according to claim 2 wherein the heating temperature ranges between 100° and 150° C.

4. The method according to claim 1 wherein the heating time is 20 minutes to 2 hours for the heating temperature ranging between 100° and 150° C.

5. The method according to claim 1 wherein the coupling agent used for surface processing of the glass base plate is diluted by an organic solvent to a concentration of 0.1 to 5 wt. %.

6. The method according to claim 1 wherein the uplifting speed of the glass base plate during said surface processing is not higher than 5 mm per second.

7. A method for producing an optical disc comprising the steps of
   processing a glass base plate by surface processing by a coupling agent,
   forming a resin layer of a resin curable with ultraviolet rays on said glass base plate processed by the coupling agent,
   bringing said resin layer on said base plate into tight contact with a stamper on which a pattern of alternate projections and recesses are formed, to form a base plate-stamper assembly,
   irradiating said base plate-stamper assembly with ultraviolet rays for photopolymerizing said resin, and
   peeling said resin layer, on which the pattern of alternate projections and recesses has been transferred from the stamper, along with said glass base plate, from said stamper,
   wherein the improvement resides in that,
   after said step of surface processing, said glass base plate is heated under reduced pressure at a heating temperature not lower than 100° C.

8. The method according to claim 7 wherein the heating temperature is not higher than the melting temperature of said glass base plate.

9. The method according to claim 8 wherein the heating temperature ranges between 100° and 150° C.

10. The method according to claim 7 wherein the heating time is 3 to 15 hours for the heating temperature ranging between 100° and 150° C.

11. The method according to claim 7 wherein the coupling agent used for surface processing of the glass base plate is diluted by an organic solvent to a concentration of 0.1 to 5 wt. %.

12. The method according to claim 7 wherein the uplifting speed of the glass base plate during said surface processing is not higher than 5 mm per second.

13. A method for producing an optical disc comprising the steps of
   processing a glass base plate by surface processing by a coupling agent,
   forming a resin layer of a resin curable with ultraviolet rays on said glass base plate processed by the coupling agent,
   bringing said resin layer on said base plate into tight contact with a stamper on which a pattern of alternate projections and recesses are formed, to form a base plate layer-stamper assembly,
   irradiating said base plate-stamper assembly with ultraviolet rays for photopolymerizing said resin, and
   peeling said resin layer, on which the pattern of alternate projections and recesses has been transferred from the stamper, along with said glass base plate, from said stamper,
   wherein the improvement resides in that, prior to and after said step of surface processing, said glass base plate is heated under reduced pressure at a heating temperature not lower than 100° C.

14. The method according to claim 13 wherein the heating temperature is not higher than the melting temperature of said glass base plate.

15. The method according to claim 14 wherein the heating temperature ranges between 100° and 150° C.

16. The method according to claim 13 wherein the heating time for heating prior to said surface processing by said coupling agent is 20 minutes to 2 hours for the heating temperature ranging between 10° and 150° C., and wherein the heating time for heating after said surface processing is 3 to 15 hours for the heating temperature ranging between 100° and 150° C.

17. The method according to claim 13 wherein the coupling agent used for surface processing of the glass base plate is diluted by an organic solvent to a concentration of 0.1 to 5 wt. %.

18. The method according to claim 13 wherein the uplifting speed of the glass base plate during said surface processing is not more than 5 mm per second.

* * * * *